(12) United States Patent
Bonislawski et al.

(10) Patent No.: US 8,802,613 B2
(45) Date of Patent: Aug. 12, 2014

(54) STABILIZED HYDROGEN PEROXIDE SOLUTIONS

(75) Inventors: David J. Bonislawski, Powder Springs, GA (US); David C. Lovetro, Marietta, GA (US)

(73) Assignee: Akzo Nobel N.V., Arnhem (NL)

( * ) Notice: Subject to any disclaimer, the term of this patent is extended or adjusted under 35 U.S.C. 154(b) by 81 days.

(21) Appl. No.: 12/747,679

(22) PCT Filed: Dec. 13, 2007

(86) PCT No.: PCT/US2007/025494
§ 371 (c)(1),
(2), (4) Date: Jun. 11, 2010

(87) PCT Pub. No.: WO2009/075663
PCT Pub. Date: Jun. 18, 2009

(65) Prior Publication Data
US 2010/0261636 A1    Oct. 14, 2010

(51) Int. Cl.
| C11D 1/22 | (2006.01) |
| C11D 3/28 | (2006.01) |
| C11D 3/36 | (2006.01) |
| C11D 3/395 | (2006.01) |
| C11D 3/39 | (2006.01) |
| C01B 15/037 | (2006.01) |

(52) U.S. Cl.
CPC ............ C11D 3/3947 (2013.01); C01B 15/037 (2013.01); C11D 3/394 (2013.01); C11D 3/364 (2013.01)
USPC ........... 510/303; 510/336; 510/337; 510/356; 510/357; 510/372; 510/421; 510/426; 510/436; 510/467

(58) Field of Classification Search
USPC ......... 510/303, 336, 337, 356, 357, 372, 421, 510/426, 436, 467
See application file for complete search history.

(56) References Cited

U.S. PATENT DOCUMENTS

| 3,234,140 A | 2/1966 | Irani |
| 3,833,517 A | 9/1974 | Ladenburg et al. |
| 3,860,391 A | 1/1975 | Kling et al. |
| 3,899,496 A | 8/1975 | Schindler et al. |
| 3,903,244 A | 9/1975 | Winkley |
| 3,954,401 A | 5/1976 | Kling et al. |
| 3,979,385 A | 9/1976 | Wollmann et al. |
| 4,098,814 A | 7/1978 | Sommer et al. |
| 4,122,151 A | 10/1978 | Plöger |
| 4,337,214 A | 6/1982 | Rohlfs et al. |
| 4,418,019 A | 11/1983 | Kose et al. |
| 4,526,582 A * | 7/1985 | Rohlfs et al. ............ 8/107 |
| 4,670,253 A | 6/1987 | Ploog et al. |
| 4,740,280 A | 4/1988 | Ruhstorfer |
| 4,752,354 A | 6/1988 | Beurich et al. |
| 4,803,068 A | 2/1989 | Ploog et al. |
| 4,873,180 A | 10/1989 | Marchesano et al. |
| 5,541,041 A | 7/1996 | Haye |
| 5,609,821 A | 3/1997 | Grimberg et al. |
| 5,885,953 A | 3/1999 | Jadesjö et al. |
| 6,110,883 A | 8/2000 | Petri et al. |
| 6,703,192 B1 | 3/2004 | Haye et al. |
| 6,852,477 B2 * | 2/2005 | Haye et al. ............ 430/450 |
| 2004/0101461 A1 | 5/2004 | Lovetro et al. |

FOREIGN PATENT DOCUMENTS

| DE | 144 073 | 9/1980 |
| DE | 101 51 180 A1 | 4/2003 |
| EP | 0 087 049 A1 | 3/1983 |
| EP | 0 141 355 A1 | 5/1985 |
| EP | 0 209 228 A1 | 1/1987 |
| EP | 289 463 A1 | 2/1988 |
| EP | 0 496 605 A2 | 7/1992 |
| EP | 0 517 966 B1 | 12/1992 |
| EP | 0 635 273 A1 | 1/1995 |
| EP | 0 845 525 A2 | 6/1998 |
| EP | 0 845 526 A2 | 6/1998 |
| EP | 1 762 252 A1 | 3/2007 |
| JP | 62-270509 A | 11/1987 |
| JP | 3-237007 A | 10/1991 |
| JP | 4-332800 A | 11/1992 |
| JP | 2000-5772 A | 1/2000 |
| JP | 2000-252250 A | 9/2000 |
| JP | 2002-155382 A | 5/2002 |
| JP | 2003-124173 A | 4/2003 |
| JP | 2003-328159 A | 11/2003 |
| JP | 2005-220365 A | 8/2005 |
| WO | WO 91/08981 A3 | 6/1991 |
| WO | WO 91/09807 A2 | 7/1991 |

(Continued)

OTHER PUBLICATIONS

International Search Report for International Application No. PCT/US2007/025494 dated Sep. 16, 2008.

(Continued)

*Primary Examiner* — Gregory R Delcotto
(74) *Attorney, Agent, or Firm* — Robert C. Morriss

(57) ABSTRACT

The present invention is directed to a stabilized hydrogen peroxide solution containing stabilizers that maintain relatively high hydrogen peroxide stability in both concentrated form and when formulated into a cleaning solution that has a pH above 6 and contains components that normally would have a destabilizing effect on the hydrogen peroxide. The stabilizers include a first cyclic amino methane diphosphonic acid compound stabilizer in combination with a second phosphonic acid based stabilizer (different from the cyclic amino methane diphosphonic acid compound), wherein the weight ratio of the first stabilizer to the second stabilizer is at least about 2:1.

9 Claims, No Drawings

(56) References Cited

FOREIGN PATENT DOCUMENTS

| WO | WO 92/16017 A1 | | 9/1992 |
|---|---|---|---|
| WO | WO 93/11459 A1 | | 6/1993 |
| WO | WO 93/14183 A1 | | 7/1993 |
| WO | WO 94/07803 A1 | | 4/1994 |
| WO | WO 95/12029 A1 | | 5/1995 |
| WO | WO 97/06303 A1 | | 2/1997 |
| WO | WO 00/76916 A1 | | 12/2000 |
| WO | WO 01/12740 A1 | | 2/2001 |
| WO | WO 03/011752 A1 | | 2/2003 |
| WO | WO 03/027008 A1 | | 4/2003 |
| WO | WO 2005/048663 A2 | | 5/2005 |
| WO | WO2006/072083 | * | 7/2006 |
| WO | WO 2007/031471 A1 | | 3/2007 |

OTHER PUBLICATIONS

Written Opinion for International Application No. PCT/US2007/025494 dated Sep. 16, 2008.
DE 101 51 180 A1 English language machine translation dated Apr. 30, 2003.
EP 0 087 049 A1 English language machine translation dated Aug. 31, 1983.
EP 0 141 355 A1 English language machine translation dated May 15, 1985.
JP 3-237007A Questel patant abstract dated Oct. 22, 1991.
JP 2000-5772 A English language machine translation dated Jan. 11, 2000.
JP 2000-252250 A English language machine translation dated Sep. 14, 2000.
JP 2002-155382 A English language machine translation dated May 31, 2002.
JP 2003-124173 A English language machine translation dated Apr. 25, 2003.
JP 2003-328159 A English language machine translation dated Nov. 19, 2003.
JP 2005-220365 A English language machine translation dated Aug. 18, 2005.
JP 4-332800 A Questel patent abstract dated Nov. 19, 1987.
JP 62-270509 A Questel patent abstract dated Nov. 24, 1987.
Fukada et al., "Synthesis of 1-Dialkylaminoalkylidenediphosphoric Acids . . . ," Japan Oil Chemsitry Society, Jun. 25, 1996, pp. 362-364.
Schirmann et al., "Hydrogen Peroxide in Organic Chemistry," Edition et documentation industrielle, France, pp. 24-25, (1976).
Schumb et al., "Hydrogen Peroxide," American Chemical Society, Reinhold Publishing Corporation, New York, NY, pp. 526-527, (1976).
DD 144 073 English language machine translation abstract from Google (references dated Oct. 17, 2012).

* cited by examiner

STABILIZED HYDROGEN PEROXIDE SOLUTIONS

This application is a national stage filing under 35 U.S.C. §371 of PCT/US2007/025494, filed Dec. 13, 2007, the contents of which are incorporated herein by reference in their entirety.

FIELD OF THE INVENTION

The field of the invention relates to stabilization of hydrogen peroxide. More particularly, it relates to hydrogen peroxide solutions containing specific stabilizers and processes for preparing formulations containing a stabilized hydrogen peroxide.

BACKGROUND OF THE INVENTION

Stabilizers are normally added to hydrogen peroxide solutions to combat decomposition due to trace impurities, mainly dissolved metals. These compounds are usually sequestering agents and can take many forms. Many types of compounds have been used to fill this function, such as diols, quinones, stannate salts, pyrophosphates, various aromatic compounds and amino carboxylic acids salts. However, many of the previously suggested compounds have various issues and challenges associated with them, such as toxicity, environmental impact and poor performance.

Examples of specific compounds that have been suggested for use in solutions to protect against hydrogen peroxide decomposition include sodium phenolsulfate; sodium stannate; N,N-lower alkyl aniline, sulfamic acid, sulfolane, and dinormal lower alkyl sulfones and sulfoxides; phosphonic acids and their salts; acrylic acid polymers; polyphosphates; polyamino polyphosphonic acids and/or their salts; and specific combinations (or blends) of such compounds. However, in addition to toxicity and environmental impact concerns, many of these suggested compounds or blends have other drawbacks. For example, use of the specific stabilizer(s) either require specific conditions to provide adequate hydrogen peroxide stability, such as specific pH levels, e.g., acidic conditions, or relatively low hydrogen peroxide concentrations, or have poor stability performance. The poor stability performance can either be poor stability performance generally or poor stability performance in specific formulations that contain other destabilizing components, e.g., surfactants.

In addition, hydrogen peroxide has been used widely as an ingredient in various cleaning solutions. Many such cleaning solutions require an alkali pH and various other ingredients, which have a destabilizing effect on the hydrogen peroxide, to achieve the desired cleaning performance. Accordingly, it would be desirable to provide such a cleaning solution where the hydrogen peroxide decomposition is minimized.

Despite considerable efforts which have been applied with available stabilizer compounds to solve the problem, there still exists a need to provide hydrogen peroxide solutions which are highly stable without the above mentioned drawbacks.

SUMMARY OF THE INVENTION

The present invention is directed to a stabilized hydrogen peroxide solution containing stabilizers which avoid the drawbacks associated with other stabilizers, as discussed above. The present stabilized hydrogen peroxide solution maintains relatively high hydrogen peroxide stability in both concentrated form and when formulated into a cleaning solution that has a pH of 6 or above and contains components that normally would have a destabilizing effect on the hydrogen peroxide.

In a first aspect, the invention is directed to a stabilized hydrogen peroxide solution that includes: (a) hydrogen peroxide in an amount from about 20 to about 70 wt %, based on the entire solution; (b) a first cyclic amino methane diphosphonic acid compound stabilizer; (c) a second phosphonic acid based stabilizer, different from the cyclic amino methane diphosphonic acid compound stabilizer; and (d) water, wherein the weight ratio of (b) to (c) is at least about 2:1. As defined more specifically below, it is to be understood that the cyclic amino methane diphosphonic acid compound stabilizer includes both salts and decomposition products of the described compound.

Preferably, the cyclic amino methane diphosphonic acid compound stabilizer corresponds to the following formula:

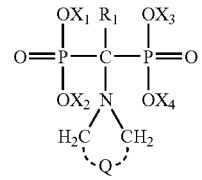

wherein $R_1$ is selected from hydrogen, $C_1$-$C_4$ alkyl and phenyl; Q represents the atoms or chemical bonds necessary to complete a 6-membered ring; and $X_1$ to $X_4$, independently from each other, are selected from hydrogen, alkali metal and ammonium. The cyclic amino methane diphosphonic acid compound stabilizer is preferably a morpholino methane diphosphonic acid salt.

In one embodiment, the phosphonic acid based stabilizer (different from the cyclic amino methane diphosphonic acid compound stabilizer) contains nitrogen in its structure. Preferably, this phosphonic acid based stabilizer is an amino phosphonic acid based compound. In one embodiment, the phosphonic acid based stabilizer contains three or more phosphonic acid groups.

In one embodiment, the phosphonic acid based stabilizer is selected from the group consisting of diethylene triamine penta(methylene phosphonic) acid, amino tri(methylene phosphonic) acid, and hexamethylene diamine tetra(methylene phosphonic) acid, their salts, their degradation products, and combinations thereof.

In one embodiment, the hydrogen peroxide is present in an amount from about 30 to about 60 wt %, based on the entire solution. In another embodiment, the hydrogen peroxide is present in an amount from about 35 to about 55 wt %, based on the entire solution.

The cyclic amino methane diphosphonic acid compound stabilizer is preferably present in an amount of from about 0.01 to about 10 wt %, more preferably about 0.1 to about 5 wt %, and most preferably about 0.3 to about 1.5 wt %, based on the amount of hydrogen peroxide. The ratio of the first stabilizer to the second stabilizer is preferably in the range from about 2:1 to about 100,000:1, more preferably about 5:1 to about 5,000:1, and most preferably about 10:1 to about 500:1.

Preferably, the first and second stabilizers are present in amounts sufficient to provide a test solution with a hydrogen peroxide stability of at least about 50% after 16 hours at about 97° C. and a pH of about 9.5 to about 9.6. The test solution is prepared by combining the stabilized hydrogen peroxide solution, in an amount sufficient to provide the test solution with a starting hydrogen peroxide content of about 3 to 3.5 wt %, with a nonionic/cationic surfactant blend in an amount of about 5 wt %, based on the weight of the test solution, and caustic in an amount to bring the pH of the test solution to about 9.5 to 9.6. Preferably, the hydrogen peroxide stability is at least about 60% and more preferably at least about 65%.

In one embodiment, the stabilized hydrogen peroxide solution contains less than 10 ppm of metals.

In another aspect, the invention is directed to a cleaning solution that contains: (a) hydrogen peroxide; (b) a first cyclic amino methane diphosphonic acid compound stabilizer; (c) a second phosphonic acid based stabilizer, different from the cyclic amino methane diphosphonic acid compound stabilizer; and (d) a surfactant; wherein the pH of the cleaning solution is above 6 and the weight ratio of (b) to (c) is at least about 2:1.

The cyclic amino methane diphosphonic acid compound stabilizer and the phosphonic acid based stabilizer (different from the cyclic amino methane diphosphonic acid compound stabilizer) are preferably the same as those described above, with respect to the stabilized hydrogen peroxide solution.

The hydrogen peroxide is preferably present in an amount from about 0.1 to about 20 wt %, more preferably about 0.3 to about 15 wt %, and most preferably about 0.5 to about 8 wt %, based on the entire cleaning solution. The cyclic amino methane diphosphonic acid compound stabilizer and the phosphonic acid based stabilizer are preferably present in the amounts described above with respect to the stabilized hydrogen peroxide solution.

The surfactant can be a type selected from the group consisting of anionic, nonionic, cationic and combinations thereof. In one embodiment, the surfactant is a type selected from the group consisting of a non-ionic surfactant, a cationic surfactant and combinations thereof. In another embodiment, the surfactant is an anionic surfactant, preferably an anionic surfactant having a phenyl sulfonic structure, either alone or in combination with a non-ionic surfactant.

The cleaning solution can also include other additives selected from the group consisting of builders, fragrances, colorants and combinations thereof. In one embodiment, the builders are selected from the group consisting of organic and inorganic salts, such as but not limited to EDTA, sodium chloride, polyphosphates and the like.

In one embodiment, the cleaning solution contains less than 10 ppm of metals.

Preferably, the pH of the cleaning solution is in the range of at least 6 to about 10.5, more preferably at least 7 to about 10.5 and most preferably about 8 to about 10. Preferably, the first and second stabilizers are present in amounts sufficient to provide the cleaning solution with a hydrogen peroxide stability of at least about 50%, more preferably at least about 60%, and most preferably at least about 65%, after 16 hours at about 97° C.

In one preferred embodiment, the hydrogen peroxide is present in an amount from about 0.1 to about 20 wt %, based on the entire cleaning solution; the first cyclic amino methane diphosphonic acid compound stabilizer is a morpholino methane diphosphonic acid salt and is present in an amount from about 0.01 to about 10 wt %, based on the amount of hydrogen peroxide; and the second phosphonic acid based stabilizer is selected from the group consisting of diethylene triamine penta(methylene phosphonic) acid, amino tri(methylene phosphonic) acid, and hexamethylene diamine tetra (methylene phosphonic) acid, their salts, their degradation products, and combinations thereof.

In yet another aspect, the invention is directed to a process for preparing a cleaning solution. The process includes combining a stabilized hydrogen peroxide solution (as described above) with a surfactant, water and an alkali agent in an amount to bring the pH of the cleaning solution to at least 6, to provide a cleaning solution containing from about 0.5 to about 20 wt % hydrogen peroxide.

Additional objects, advantages and novel features will be apparent to those skilled in the art upon examination of the description that follows.

DETAILED DESCRIPTION OF THE INVENTION

The present invention is directed to a stabilized hydrogen peroxide solution containing stabilizers that maintain relatively high hydrogen peroxide stability in both concentrated form and when formulated into a cleaning solution that has a pH above 6 and contains components that normally would have a destabilizing effect on the hydrogen peroxide.

The present invention utilizes a cyclic amino methane diphosphonic acid compound stabilizer in combination with a phosphonic acid based stabilizer, other than the cyclic amino methane diphosphonic acid compound stabilizer.

By the term "cyclic amino methane diphosphonic acid compound stabilizer" is intended to include compounds having a cyclic amino methane diphosphonic acid structure, including compounds in their acid form or salts thereof, as well as decomposition products of such compounds.

Similarly, by the term "phosphonic acid based stabilizer" is intended to include compounds having at least one phosphonic acid group in its structure, including compounds in their acid form or salts thereof, as well as decomposition products of such compounds.

The cyclic amino methane diphosphonic acid compound stabilizer according to the invention preferably corresponds to the following formula:

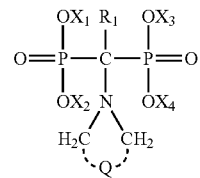

wherein $R_1$ is selected from hydrogen, $C_1$-$C_4$ alkyl and phenyl; Q represents the atoms or chemical bonds necessary to complete a 6-membered ring; and $X_1$ to $X_4$, independently from each other, are selected from hydrogen, alkali metal and ammonium. The 6-membered ring preferably includes oxygen in the ring structure, preferably the oxygen is positioned directly across from the nitrogen.

The phosphonic acid based stabilizer can include commercially available compounds which include a phosphonic acid group in their structure. Non-limiting examples of such stabilizers include 1-hydroxy-1,1-ethylidene diphosphonate commercially available as DEQUEST 2010, amino trimethylene-phosphonic acid) available as DEQUEST 2000 and DEQUEST 2000LC; amino tri(methylene-phosphonic acid) pentasodium salt available as DEQUEST 2006; 1-hydroxyethylene-1,1,-diphosphonic acid commercially available as DEQUEST 2010; 1-hydroxyethylene-1,1,-diphosphonic acid tetrasodium salt available as DEQUEST 2016 and DEQUEST 2016D; ethylene diamine tetra(methylene phosphonic acid) available as DEQUEST 2041; ethylene diamine tetra(methylene phosphonic acid) pentasodium salt available as DEQUEST 2046; hexamethylenediamine tetra(methylene phosphonic acid) potassium salt available as DEQUEST 2054; diethylenetriamine penta(methylene phosphonic acid) available as DEQUEST 2060S; diethylenetriamine penta(methylenephosphonic acid)trisodium salt available as DEQUEST 2066A; diethylenetriamine penta(methylenephosphonic acid)pentasodium salt available as DEQUEST 2066; diethylenetriamine penta(methylene phosphonic acid) pentasodium salt commercially available as DEQUEST 2066C2; bis-hexamethylene triaminepenta(methylenephosphonic acid) chloride salt commercially available as DEQUEST 2090A; tetrasodium salt of 1-hydroxy ethyliden (1,1-diphosphonic acid) commercially available as DEQUEST SPE 9528, as well as other materials sold under the DEQUEST tradename, particularly DEQUEST 2086, DEQUEST 3000S, as well as DEQUEST 6004.

In one embodiment, the phosphonic acid based stabilizer contains nitrogen in its structure. Preferably, this phosphonic acid based stabilizer is an amino phosphonic acid based compound. In one embodiment, the phosphonic acid based stabilizer contains three or more phosphonic acid groups. Preferably, the phosphonic acid based stabilizer contains both nitrogen and three or more phosphonic acid groups in its structure.

In a preferred embodiment, the phosphonic acid based stabilizer is selected from the group consisting of diethylene triamine penta(methylene phosphonic) acid, amino tri(methylene phosphonic) acid, and hexamethylene diamine tetra (methylene phosphonic) acid, their salts, their degradation products, and combinations thereof.

The stabilized hydrogen peroxide solution according to the invention preferably includes a cyclic amino (methylene phosphonic acid) salt in combination with at least one phosphonic acid salt (as described above) in amounts sufficient to achieve enhanced hydrogen peroxide stability in formulations with pH's over 7. It is believed that the ring structure of cyclic amino (methylene phosphonic acid) salts gives these compounds similar stabilizing attributes to phenols without the attendant negative environmental and toxicity impact.

The cyclic amino methane diphosphonic acid compound stabilizer is preferably a morpholino methane diphosphonic acid salt that corresponds to the following formula:

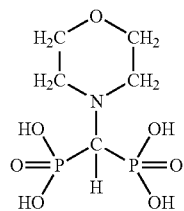

This morpholino methane diphosphonic acid salt (MMDA) is also preferred because of the fact that it is non-toxic.

The stabilized hydrogen peroxide solution, that can be used as concentrated hydrogen peroxide solution or used to prepare (lower concentration) cleaning solutions according to the invention, preferably contains hydrogen peroxide in an amount from about 20 to about 70 wt %, more preferably about 30 to about 60 wt %, and most preferably about 35 to about 55 wt %, based on the entire solution. It is contemplated that the hydrogen peroxide can be introduced in the form of a peroxyhydrate or other agent which release hydrogen peroxide in solution. Preferably, hydrogen peroxide is directly introduced to form the solutions according to the invention.

The cyclic amino methane diphosphonic acid compound stabilizer and phosphonic acid based stabilizer are preferably present in amounts and in a ratio sufficient to provide a test solution with a hydrogen peroxide stability of at least about 50% after 16 hours at about 97° C. and a pH of about 9.5 to about 9.6. The test solution is prepared by combining the stabilized hydrogen peroxide solution, in an amount sufficient to provide the test solution with a starting hydrogen peroxide content of about 3 to 3.5 wt %, with a nonionic/cationic surfactant blend in an amount of about 5 wt %, based on the weight of the test solution, and caustic in an amount to bring the pH of the test solution to about 9.5 to 9.6. Preferably, the hydrogen peroxide stability is at least about 60% and more preferably at least about 65%.

The cyclic amino methane diphosphonic acid compound stabilizer is preferably present in an amount of from about 0.01 to about 10 wt %, more preferably about 0.1 to about 5 wt %, and most preferably about 0.3 to about 1.5 wt %, based on the amount of hydrogen peroxide. The ratio of cyclic amino methane diphosphonic acid compound stabilizer to phosphonic acid based stabilizer is preferably in the range from about 2:1 to about 100,000:1, more preferably about 5:1 to about 5,000:1, and most preferably about 10:1 to about 500:1.

The stabilized hydrogen peroxide solution (described above) can be used to prepare a cleaning solution that contains hydrogen peroxide, to provide a cleaning solution having relatively high hydrogen peroxide stability without the need to add additional stabilizers to the cleaning solution. The stabilized hydrogen peroxide solution is preferably added to the cleaning solution in an amount to provide a cleaning solution having an initial hydrogen peroxide concentration of from about 0.1 to about 20 wt %, more preferably about 0.3 to about 15 wt %, and most preferably about 0.5 to about 8 wt %, based on the entire cleaning solution.

The cleaning solution is preferably prepared by combining the hydrogen peroxide solution with at least one surfactant, water and an alkali agent in an amount to bring the pH of the cleaning solution to at least 6.

It is contemplated that the surfactant can be of a type selected from the group consisting nonionic, cationic, anionic, amphoteric, zwitterionic, and combinations thereof. The surfactant is suitably present in an amount for about 0.1 to about 15 wt %, preferably about 0.3 to about 10 wt %, more preferably about 0.5 to about 8 wt %, based on the total weight of the cleaning solution.

In one embodiment, the surfactant is preferably of a type selected from the group consisting of nonionic, cationic and combinations thereof. Generally any nonionic surfactant material may be used in the inventive compositions. Practically any hydrophobic compound having a carboxy, hydroxy, amido, or amino group with a free hydrogen attached to the nitrogen can be condensed with an alkylene oxide, especially ethylene oxide or with the polyhydration product thereof, a polyalkylene glycol, especially polyethylene glycol, to form a water soluble or water dispersible nonionic surfactant compound. By way of non-limiting examples, suitable nonionic surfactants which may be used in the present invention include polyalkylene oxide condensates of alkyl phenols; the condensation products of aliphatic alcohols with an alkylene oxide, e.g., an ethylene oxide; primary and secondary linear and branched alcohol ethoxylates; and alkoxy block copolymers, and in particular, compounds based on ethoxy/propoxy block copolymers. Other examples of suitable nonionic surfactants include surfactants sold under the trade names Berol® 260, Berol® 505, and Berol® 508 (all from Akzo Nobel).

A surfactant can be considered cationic if the charge on the hydrophilic portion of the molecule is positive. Surfactants in which the hydrophile carries no charge unless the pH is lowered close to neutrality or lower, but which are then cationic (e.g. alkyl amines), are also included in this group. Suitable cationic surfactants can be easily determined by one skilled in the art. By way of non-limiting examples, suitable cationic surfactants can include compounds containing at least one long carbon chain hydrophobic group and at least one positively charged nitrogen. In addition, suitable cationic surfactants may contain complex linkages having more than one cationic nitrogen atom. The cationic surfactant can include a quaternary ammonium surfactant, such as tallow quaternary ammonium surfactant, such as a tallow amine ethoxylate quaternary ammonium compound. One cationic surfactant suitable for the present invention is sold under the trade name Berol® 563SA (from Akzo Nobel). Blends of nonionic and cationic surfactants are also contemplated. Examples of such blends include surfactants sold under the trade names Berol® 226SA and Berol® EZ-1 (from Akzo Nobel).

In another embodiment, the surfactant is an anionic surfactant. Generally any anionic surfactant material may be used in the inventive compositions. By way of non-limiting example, particularly suitable anionic surfactants include: alkali metal salts, ammonium salts, amine salts, or aminoalcohol salts of one or more of the following compounds (linear and secondary): alcohol sulfates and sulfonates, alcohol phosphates and phosphonates, alkyl sulfates, alkyl ether sulfates, sulfate esters of an alkylphenoxy polyoxyethylene ethanol, alkyl monoglyceride sulfates, alkyl sulfonates, olefin sulfonates, paraffin sulfonates, beta-alkoxy alkane sulfonates, alkylamidoether sulfates, alkylaryl polyether sulfates, monoglyceride sulfates, alkyl ether sulfonates, ethoxylated alkyl sulfonates, alkylaryl sulfonates, alkyl benzene sulfonates, alkylamide sulfonates, alkyl monoglyceride sulfonates, alkyl carboxylates, alkyl sulfoacetates, alkyl ether carboxylates, alkyl alkoxy carboxylates having 1 to 5 moles of ethylene oxide, alkyl sulfosuccinates, alkyl ether sulfosuccinates, alkylamide sulfosuccinates, alkyl sulfosuccinamates, octoxynol or nonoxynol phosphates, alkyl phosphates, alkyl ether phosphates, taurates, N-acyl taurates, fatty taurides, fatty acid amide polyoxyethylene sulfates, isethionates, acyl isethionates, and sarcosinates, acyl sarcosinates, or mixtures thereof. Generally, the alkyl or acyl radical in these various compounds can include a carbon chain containing 12 to 20 carbon atoms. Examples of specific anionic surfactants suitable for the invention include sodium xylene sulfonate surfactants, as well as naphthalene sulfonate surfactants sold under the trade names Petro BA, Petro AA and Petro ULF (from Akzo Nobel). In one preferred embodiment, the anionic surfactant has a phenyl sulfonic structure, such as Petro AA.

The pH of the cleaning solution can be adjusted using an alkali agent selected from the group consisting of sodium hydroxide, various ethanol amines, ammonium hydroxide, and mixtures thereof, with sodium hydroxide being preferred. Preferably the pH of the cleaning solution is in the range of at least 7 to about 10.5, and more preferably about 8 to about 10.

The solutions of the present invention can also optionally include one or more further constituents which are directed to improving the aesthetic or functional features of the inventive compositions. By way of non-limiting example such further constituents include one or more builders, coloring agents, fragrances and fragrance solubilizers, viscosity modifying agents, other surfactants, other pH adjusting agents and pH buffers including organic and inorganic salts, optical brighteners, opacifying agents, hydrotropes, antifoaming agents, enzymes, anti-spotting agents, anti-oxidants, preservatives, and anti-corrosion agents. When one or more of the optional constituents is added, i.e., fragrance and/or coloring agents, the esthetic and consumer appeal of the product is often favorably improved. The use and selection of these optional constituents is well known to those of ordinary skill in the art. When present, the one or more optional constituents present in the inventive compositions generally do not exceed about 20% wt., preferably do not exceed 15% wt., and most preferably do not exceed 10% wt.

Certain optional constituents which are nonetheless desirably present in the inventive compositions are pH adjusting agents and especially pH buffers. Such pH buffers include many materials which are known to the art and which are conventionally used in hard surface cleaning and/or hard surface disinfecting compositions. By way of non-limiting example pH adjusting agents include phosphorus containing compounds, monovalent and polyvalent salts such as of silicates, carbonates, and borates, certain acids and bases, tartrates and certain acetates. Further exemplary pH adjusting agents include mineral acids, basic compositions, and organic acids, which are typically required in only minor amounts. By way of further non-limiting example pH buffering compositions include the alkali metal phosphates, polyphosphates, pyrophosphates, triphosphates, tetraphosphates, silicates, metasilicates, polysilicates, carbonates, hydroxides, and mixtures of the same. Certain salts, such as the alkaline earth phosphates, carbonates, hydroxides, can also function as buffers. It may also be suitable to use as buffers such materials as aluminosilicates (zeolites), borates, aluminates and certain organic materials such as gluconates, succinates, maleates, and their alkali metal salts. When present, the pH adjusting agent, especially the pH buffers are present in an amount effective in order to maintain the pH of the inventive composition within a target pH range.

Examples of suitable builders include sodium chloride, EDTA and various biodegradable chelating agents. In one embodiment, the builders are selected from the group consisting of organic and inorganic salts. Preferred builders include sodium chloride and a biodegradable chelate, GL-38S (from Akzo Nobel).

In one embodiment, the cleaning solution contains less than 10 ppm of metals.

The examples set forth below are for the purpose of illustration and to describe embodiments of the best mode of the invention at the present time. The scope of the invention is not in any way limited by the examples set forth below.

EXAMPLES

The following examples have been carried out to illustrate preferred embodiments of the invention. These examples include the preparation of test solutions and hydrogen peroxide stability tests conducted on the test solutions.

Examples 1-7

Test solutions were prepared using the following stabilizer compounds: 1-Hydroxy-ethane diphosphonic acid salt (HEDP) (Dequest 2010), Diethylenetriamine penta(methylenephosphonic acid) salt (DTPMP) (Dequest 2060 as acid and Dequest 2066A as the partially neutralized salt), Amino tris(methylenephosphonic acid) salt (ATMP) (Dequest 2000LC) and Morpholino methane diphosphonic acid salt (MMDA) (Budex 5103, manufactured by Buddenheim Chemical as a partially neutralized (50%) sodium salt). Hydrogen peroxide solutions containing about 35% hydrogen peroxide were prepared using the stabilizers and stabilizer combinations according to Table 1 below.

TABLE 1

Stabilizer Combinations (all concentrations in mg/l in 35% $H_2O_2$)

| Test # | HEDP | DTPMP | ATMP | MMDA |
|---|---|---|---|---|
| 1 | 250 | — | — | — |
| 2 | — | — | 250 | — |
| 3 | — | 250 | — | — |
| 4 | 250 | — | — | 3000 |
| 5 | — | — | 250 | 3000 |
| 6 | — | 250 | — | 3000 |
| 7 | — | — | 250 + 3000 | — |

Each of the hydrogen peroxide solutions from Table 1 were then formulated into a test solution comprising 3 to 3.5% $H_2O_2$, 5% surfactant nonionic/cationic blend (Berol® 226SA from Akzo Nobel), and caustic sufficient to bring the pH to 9.5 to 9.6. Samples of each formulation were then subjected to accelerated stability testing simulating one year at room temperature (typically 16 hours at 97° C.). The percentage of initial oxidizer remaining is recorded as "% stability".

TABLE 2

Stability Tests

| Run # | Stabilizer Combination | % Stability |
|---|---|---|
| 1 | HEDP | 3.90% |
| 2 | ATMP | 4.50% |
| 3 | DTPMP | 16.2% |
| 4 | HEDP + MMDA | 45.0% |
| 5 | ATMP + MMDA | 68.1% |
| 6 | DTPMP + MMDA | 66.1% |
| 7 | ATMP + ATMP | 13.9% |

A review of Table 2 reveals that under alkaline conditions with the added burden of an organic surfactant blend (nonionic/cationic), accelerated stability testing shows a definite stability performance advantage to those test solutions with the MMDA. It was also observed (from comparisons of Runs 4-6) that the Run using a phosphonic acid compound lacking nitrogen in its structure (HEDP) did not fare as well as the other Runs.

Thus, while there has been disclosed what is presently believed to be the preferred embodiments of the invention, those skilled in the art will appreciate that other and further changes and modifications can be made without departing from the scope or spirit of the invention, and it is intended that all such other changes and modifications are included within the scope of the invention as described in the appended claims.

We claim:

1. A cleaning solution comprising:
    (a) from about 0.5 to about 8 wt %, based on the entire solution, of hydrogen peroxide;
    (b) from about 0.3 to about 1.5 wt %, based on the amount of hydrogen peroxide, of a first cyclic amino methane diphosphonic acid compound stabilizer;
    (c) a second phosphonic acid based stabilizer, different from said first cyclic amino methane diphosphonic acid compound, selected from the group consisting of an amino phosphonic acid having three or more phosphonic acid groups in its structure, their salts, and combinations thereof; and
    (d) a surfactant;
    wherein the pH of said cleaning solution is at least 7 to about 10.5 and the weight ratio of (b) to (c) is in the range from about 10:1 to about 500:1.

2. A solution according to claim 1, wherein said first cyclic amino methane diphosphonic acid compound stabilizer corresponds to the following formula:

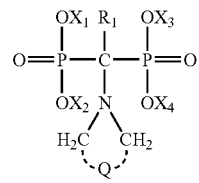

wherein $R_1$ is selected from hydrogen, $C_1$-$C_4$ alkyl and phenyl; Q represents the atoms or chemical bonds necessary to complete a 6-membered ring; and $X_1$ to $X_4$, independently from each other, are selected from hydrogen, alkali metal and ammonium.

3. A solution according to claim 2, wherein said surfactant is selected from the group consisting of a non-ionic surfactant, a cationic surfactant, and combinations thereof.

4. A solution according to claim 2, wherein said surfactant is selected from the group consisting of a non-ionic surfactant, an anionic surfactant, and combinations thereof.

5. A solution according to claim 4, wherein said anionic surfactant has a phenyl sulfonic structure.

6. A solution according to claim 1, wherein the pH of said cleaning solution is in the range of 8 to 10.

7. A solution according to claim 6, wherein said second phosphonic acid based stabilizer is selected from the group consisting of diethylene triamine penta(methylene phosphonic) acid, amino tri(methylene phosphonic) acid, and hexamethylene diamine tetra(methylene phosphonic) acid, their salts, and combinations thereof.

8. A solution according to claim 7, wherein said second phosphonic acid based stabilizer is selected from the group consisting of diethylene triamine penta(methylene phosphonic) acid, amino tri(methylene phosphonic) acid, their salts, and combinations thereof.

9. A solution according to claim 8, wherein said second phosphonic acid based stabilizer is amino tris(methylenephosphonic acid) salt.

* * * * *